United States Patent [19]

Ronning

[11] 4,346,523
[45] Aug. 31, 1982

[54] METHOD AND APPARATUS FOR RECOVERING HEAT IN PRODUCT DEHYDRATION SYSTEM

[75] Inventor: Richard L. Ronning, Overland Park, Kans.

[73] Assignee: Ronning Engineering Company Inc., Overland Park, Kans.

[21] Appl. No.: 207,216

[22] Filed: Nov. 17, 1980

[51] Int. Cl.³ .............................................. F26B 7/00
[52] U.S. Cl. .......................................... 34/17; 34/33; 34/68; 34/129; 34/134; 34/137; 34/35; 34/86; 432/106
[58] Field of Search ............... 432/105, 107, 111, 112, 432/114, 106; 34/128, 129, 134–138, 140–142, 35, 17, 33, 68, 86

[56] References Cited

U.S. PATENT DOCUMENTS

| 38,816 | 6/1863 | Dole et al. | 34/129 |
|---|---|---|---|
| 1,358,313 | 11/1920 | Hero | 34/128 |
| 3,785,063 | 1/1974 | Bishop | 34/129 |
| 3,793,741 | 2/1974 | Smith, Jr. | 34/68 |

*Primary Examiner*—Larry I. Schwartz
*Attorney, Agent, or Firm*—Schmidt, Johnson, Hovey & Williams

[57] ABSTRACT

An improved, fuel efficient crop drying system and method is disclosed which makes use of the waste heat from a primary rotary drum dryer in order to predry the crop in a two-pass, indirect heat exchange dryer. The predryer and primary dryer are coupled in a pneumatic (negative pressure) conduit loop so that crop is conveyed in serial order through the dryers. The predryer includes respective, adjacent, two-pass air and crop paths disposed within a tubular shell, and the entire predryer is axially rotated during operation thereof. The ultimate volumetric air discharge from the system is significantly reduced as compared with conventional rotary dryers, and the saturated wet scrubbing which occurs in the predryer displaces a high percentage of particulate matter from the gaseous discharge to the water discharge, thereby reducing atmospheric pollution.

7 Claims, 6 Drawing Figures

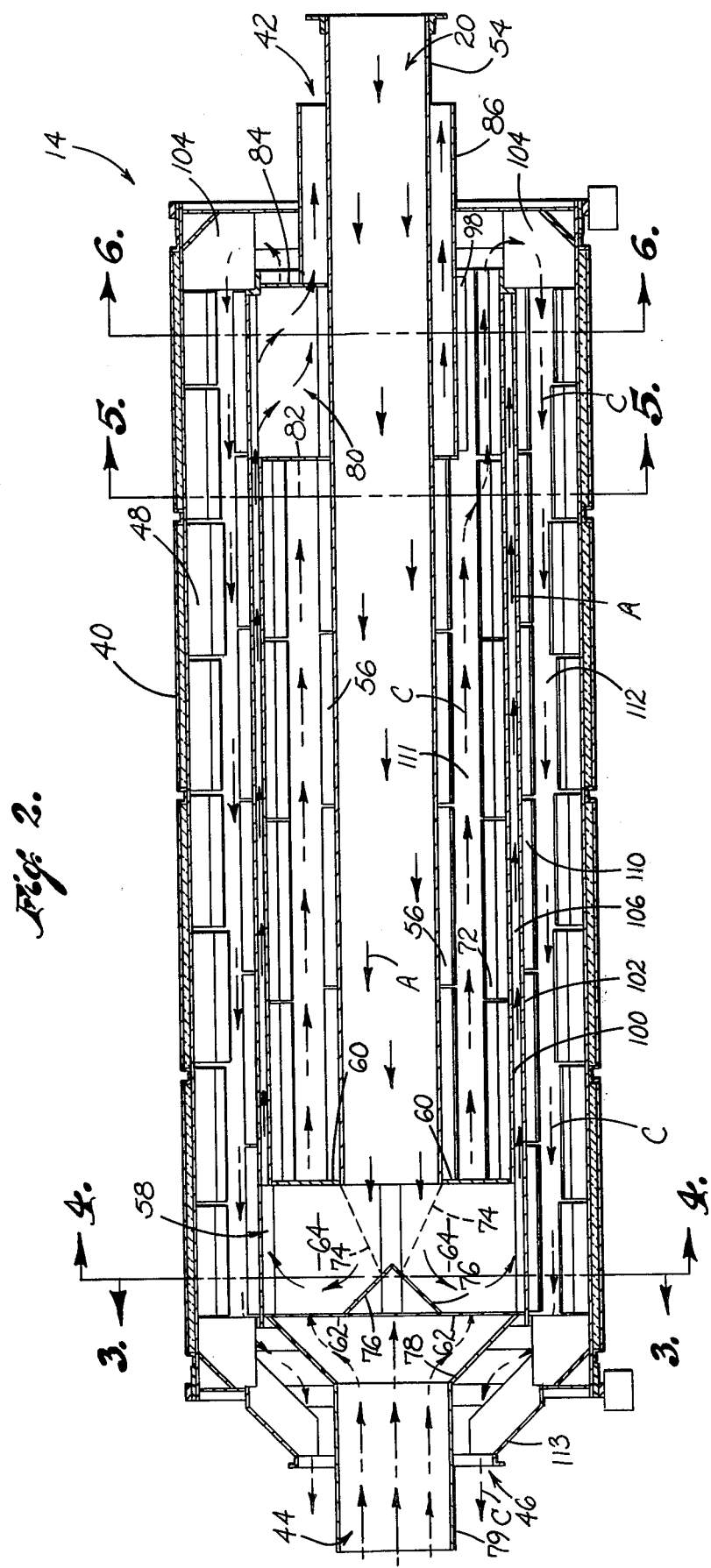

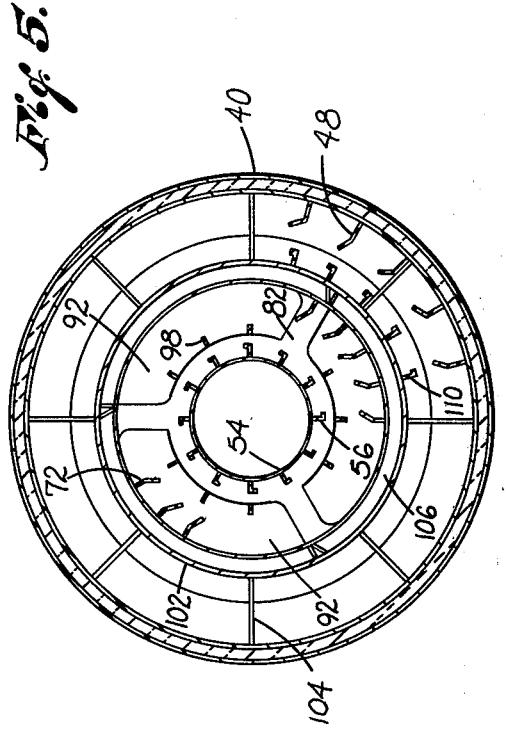
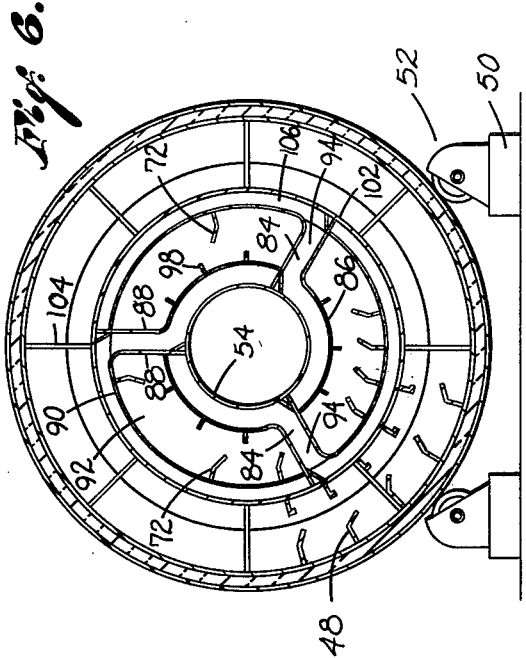
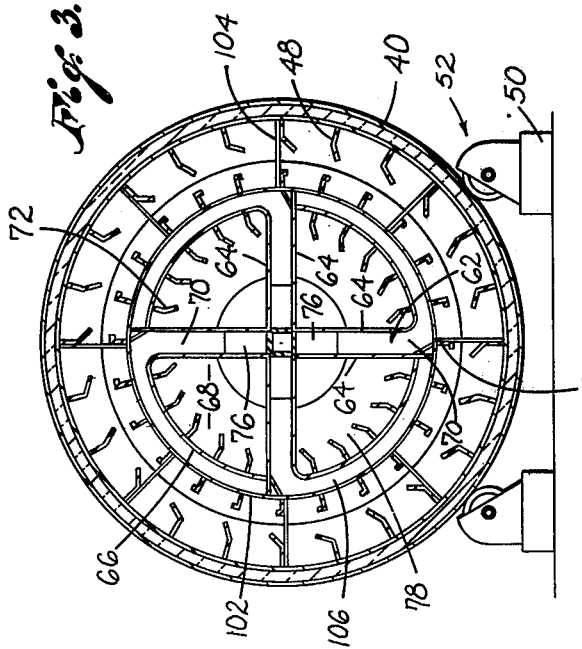
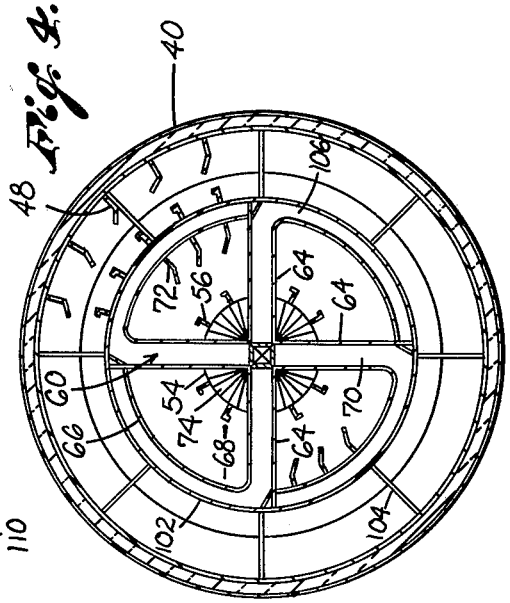

METHOD AND APPARATUS FOR RECOVERING HEAT IN PRODUCT DEHYDRATION SYSTEM

BACKGROUND OF THE INVENTION

1. Field of the Invention

The present invention is concerned with an improved crop drying system and method, and with a preferred predrying apparatus for use in the overall system. More particularly, it is concerned with such a system which preferably includes a conventional rotary kiln primary dryer along with an indirect heat exchange predryer and structure operatively coupling the dryers such that the waste heat from the primary dryer is employed in the predryer. In this fashion heat utilization is increased with a concomitant decrease in fuel costs, drying capacity is increased as compared with the single rotary dryer, and atmospheric pollution is measurably lessened.

2. Description of the Prior Art

Direct fired rotary kiln drum dryers are conventionally used for drying a variety of crops such as alfalfa and the like. In such units, hot air heated from a furnace or burner is directed to the elongated, axially rotating drum along with crop to be dried. The dried crop and hot, moist air are discharged from the dryer and are separated, usually by means of a cyclone separator. In this conventional arrangement, the hot, moist air from the dryer outlet is simply discharged to the atmosphere. This practice is extremely wasteful in terms of energy usage, particularly when it is appreciated that in many cases a high percentage (e.g., approximately 80 percent) of the total heat expended by the dryer is available for drying purposes. In short, the conventional practice is relatively inefficient in terms of energy usage.

Moreover, drying operations of the conventional variety are troublesome in that large quantities of particulate material can be discharged into the atmosphere. This problem has led to the promulgation of a plethora of rules and regulations regarding particulate discharge from such installations. This has in turn forced many operators to install expensive supplemental equipment in an attempt to alleviate the pollution problem.

SUMMARY OF THE INVENTION

In one aspect, the present invention is concerned with a crop drying system which includes a primary dryer, an indirect heat exchange predryer including structure defining respective adjacent crop and air paths therethrough, and means for conveying hot discharge air from the primary dryer to the air path of the indirect heat exchange predryer. Apparatus is also provided for introducing a crop to be dried first into the predryer crop path, and for thereafter conveying the crop in serial order through the predryer and thence into the primary dryer, whereupon it is separated as a dried product.

In particularly preferred forms, the predryer includes an elongated, tubular outer shell presenting a waste inlet, a hot gas outlet, an air plus crop inlet and an air plus crop outlet. Respective two-pass air and crop paths defined by concentric tubes and sleeves are disposed within the tubular shell for separate, indirect heat exchange passage of hot, moist air and crop through the predryer.

BRIEF DESCRIPTION OF THE DRAWINGS

FIG. 2 is an enlarged vertical sectional view taken along line 2—2 of FIG. 1 which illustrates the details of construction of the preferred predrying apparatus;

FIG. 3 is a vertical sectional view taken along line 3—3 of FIG. 2;

FIG. 4 is a vertical sectional view taken along line 4—4 of FIG. 2;

FIG. 5 is a vertical sectional view taken along line 5—5 of FIG. 2; and

FIG. 6 is a vertical sectional view taken along line 6—6 of FIG. 2.

DESCRIPTION OF THE PREFERRED EMBODIMENT

Figure 1:
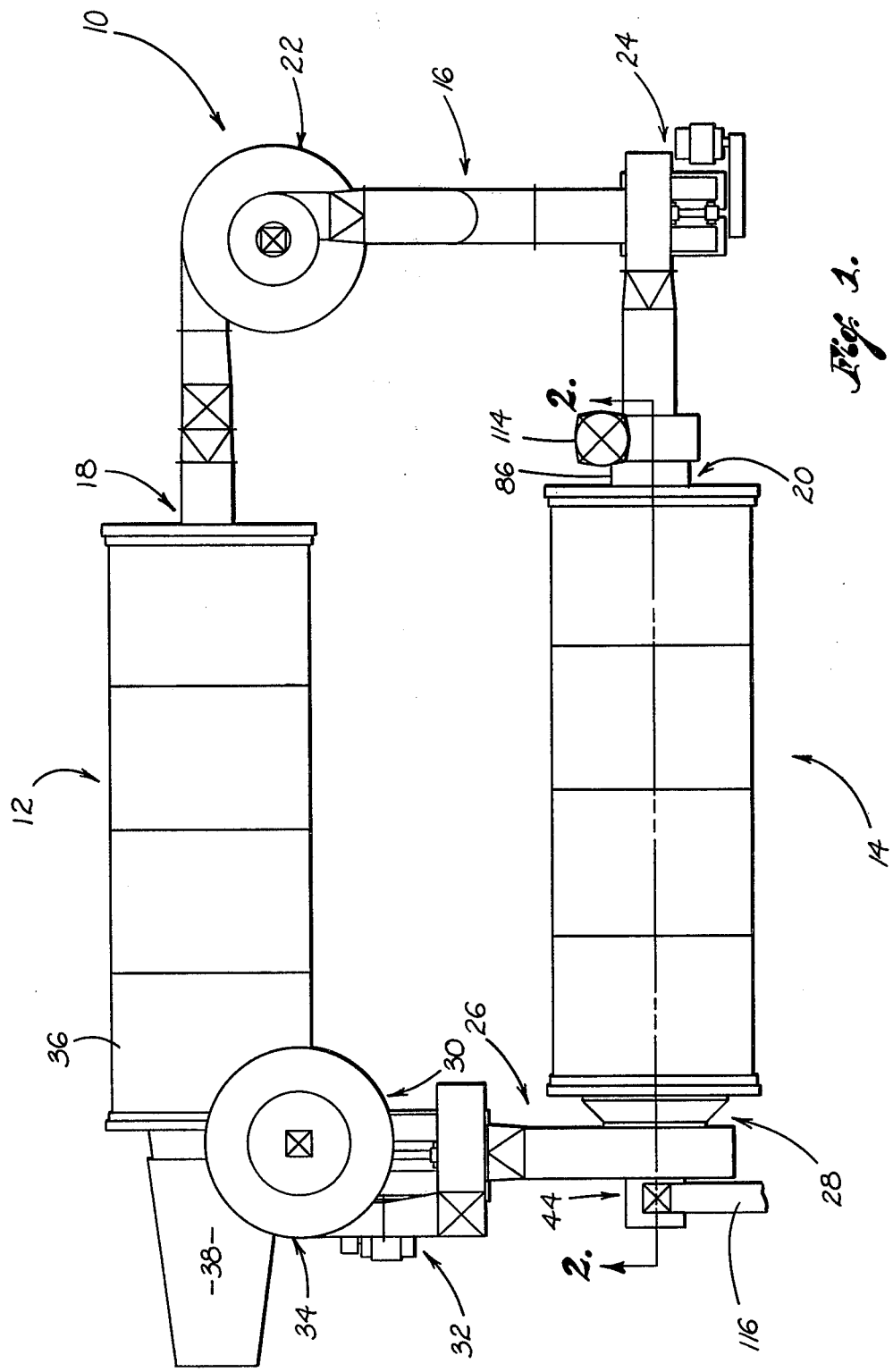
FIG. 1 is a plan view of a crop drying system in accordance with the invention.

Turning now to the drawing, a crop drying system 10 (see FIG. 1) includes a primary rotary drum-type kiln dryer 12, a predryer 14, a conduit 16 operatively coupled between the outlet 18 of dryer 12 and the air inlet 20 of predryer 14. A cyclone separator 22 is interposed within conduit 16, along with a fan 24. The system 10 further includes a conduit 26 which is operatively coupled between the crop outlet 28 of predryer 14, and the crop inlet 30 of primary dryer 12. A fan 32 and cyclone separator 34 are interposed within conduit 26 as illustrated.

Primary dryer 12 is of conventional construction and includes the usual elongated, axially rotatable drum 36 mounted for rotation upon appropriate footings and rollers (not shown) and is provided with internal flighting. The furnace 38 is disposed adjacent the inlet end of drum 36, and serves to supply hot air to the primary dryer 12.

In like manner, the conduits 16 and 26, as well as the respective separators 22 and 34, and fans 24 and 32, are all of conventional construction and operation. Accordingly, a detailed discussion of these elements is unwarranted, except insofar as needed for a complete understanding of the operation of system 10.

Turning now to FIGS. 2-6, the construction of predryer 14 will be explained. Broadly speaking, the predryer includes an elongated, tubular shell 40 having an air inlet 20, an air outlet 42, a crop inlet 44, and a crop outlet 46. A series of axially and circumferentially spaced flights 48 are secured to the inner surface of shell 40, and the latter is mounted for rotation on appropriate spaced apart blocks 50 and rollers 52.

The respective adjacent air and crop paths are defined within the interior of shell 40 in order to bring the hot moist air from primary dryer 12 into indirect heat exchange contact with a crop to be predried. One pass of the air path is defined by an elongated, central tube 54 which extends along the length of shell 40 and projects outwardly therefrom for defining air inlet end 20. A plurality of flights 56 are welded onto the exterior of tube 54 as shown.

A cylindrical air and crop separation chamber 58 is mounted adjacent the end of tube 54 remote from inlet 20. The chamber 58 includes four equally and circumferentially spaced apart, outwardly extending plate-like ribs 60 secured to the innermost end of tube 54, along with four similarly oriented rib plates 62 spaced axially from the ribs 60. A total of eight separation plates 64 are interconnected between respective associated pairs of ribs 60, 62 as shown in FIGS. 3 and 4. Arcuate outermost plates 66 interconnect orthogonal pair of plates 64 so as to define four elongated, circumferentially spaced, somewhat triangular in cross section crop-conveying regions 68 along the length of chamber 58, with narrow air-conveying region 70 between each pair of regions 68 and separate from the latter. As illustrated, the inner faces of the arcuate plates 66 are equipped with spaced, inwardly extending flights 72. In addition, a somewhat conical crop deflector 74 is provided within each region 68 as illustrated. Finally, an obliquely oriented air deflector 76 is secured within each air-conveying region 70 for purposes to be described.

A frustoconical crop inlet hood 78 is secured to the face of ribs 62 exteriorily of chamber 58, and has an inlet tube 79 coupled thereto as illustrated. The hood 78 communicates with the crop-conveying regions 68 of the chamber 58, but the ribs 62 serve to block off the air-conveying regions 70 from such communication.

An air and crop separation chamber 80 is also provided adjacent the righthand end of predryer 14 as viewed in FIG. 2. In this case, the chamber 80 includes three equally circumferentially spaced apart, outwardly extending ribs 82 secured to tube 54, along with a set of ribs 84 which are axially spaced from the ribs 82 and equally spaced about the tube 54 in a manner identical to that of the ribs 82. However, the ribs 84 are secured to an air outlet sleeve 86 which is disposed about tube 54 as shown. The ribs 84 extend outwardly from the sleeve 86, and six radially extending, spaced apart plates 88 extend between and are connected to the ribs 82, 84. Inner and outer arcuate plates 90 interconnect respective pairs of plates 88, so as to define three crop-conveying regions 92 in the chamber 80, along with three narrow air-conveying regions 94. Flights 72 extend across and are connected to the outer arcuate plate 90; and flights 98 are secured to the opposed, inner plate 98.

A pair of concentric sleeve elements 100 and 102 are concentrically disposed about tube 54. As illustrated, inner sleeve element 100 is secured to the outermost end of the ribs 60, and to appropriate connection structure 104 adjacent the air inlet end of predryer 14. On the other hand, the outer sleeve 102 is somewhat longer than inner sleeve 100 and is connected to the ribs 62 and to structure 104. In this fashion, an air-conveying annular region 106 is defined between the inner and outer sleeve elements 100, 102; moreover, it will be seen that the annular region 106 is in communication with the respective air-conveying regions 70 of the chamber 58, and with the regions of chamber 80. Finally, it will be observed that flighting 72 extends across and is secured to the inner surface of sleeve element 100, whereas flighting 110 is secured to the outer surface of sleeve element 102.

An annular space 111 is defined between tube 54 and sleeve 100, whereas another annular space 112 is defined between sleeve 110 and outer shell 40. Finally, it will be seen that a somewhat frustoconical sleeve 113 is disposed in spaced relationship about hood 78 and is in communication with annular space 112.

It will now be appreciated that the air path (see arrows "A" of FIG. 2) through predryer 14 is of two-pass configuration. The first leg of the path is defined by the central tube 54, whereas the second leg thereof is defined by the region 106 between the sleeve elements 100, 102. In the chamber 58, air from the tube 54 is diverted (this being assisted by virtue of the deflectors 76) and passed into the annular region 106. At the other end of tube 54, the air passes through the regions 94 of chamber 80 and ultimately out through the sleeve 86 surrounding tube 54. This sleeve 86 is operatively connected with a discharge stack 114 (see FIG. 1) which defines the air discharge for the entire system 10.

The crop path through predryer 14 (see arrows "C" of FIG. 2) begins with inlet tube 79 and hood 78, whereupon the crop passes through the crop-conveying regions 68 of chamber 58 and thence into the flighted annular space 111 between tube 54 and sleeve element 100. The crop then passes through the regions 92 of chamber 80 and passes back through the outermost annular spaces 112 between sleeve element 100 and outer shell 40. Ultimately, the crop passes through the frustoconical region defined between hood 78 and sleeve 113 for continued travel through system 10.

In the operation of overall system 10, a crop is fed through a conventional auger feed apparatus 116 into inlet tube 79 while predryer 14 rotates. At this point the crop travels along the two-pass path described above until it exits through the sleeve 113. The predried crop thereafter passes in serial order through conduit 26, primary dryer 12, and conduit 16, until it is separated by the cyclone separator 22 as a dried product.

During passage of the crop through predryer 14 as described, hot, moist air is simultaneously passed therethrough. Specifically, the hot, moist air from primary dryer 12 and separator 22 is passed into inlet 20 of tube 54 whereupon it is conveyed as described above through chamber 58, annular region 106, chamber 80, sleeve 86 and ultimately out through stack 114.

The crop and air are conveyed through the loop of system 10 under the influence of the negative pressure created by the fans 24 and 32 respectively interposed in the conduits 16 and 26.

Hence, it will be seen that the hot, moist air from primary dryer 12 is passed in indirect heat exchange relationship with entering crop to be dried in predryer 14. Both the crop and air pass first in one axial direction along the length of predryer 14, and then along the opposite axial direction before exiting the predryer. Moreover, the initial axial directions of travel of the crop and air are opposite. As explained above, use of such a predryer represents a significant increase in overall efficiency and energy utilization. Also, particulate emissions which would normally be discharged to the atmosphere are significantly reduced, by virtue of the saturated wet scrubbing which occurs in predryer 14.

The greatly improved drying efficiency and lower energy cost attributable to the present invention can best be illustrated in the following example. A typical primary dryer which evaporates 18,000 lbs. of water per hour using about 1800 BTU per lb. of water evaporated and 100% excess air can be employed in the present invention, along with the described predryer, giving the following illustrative values:

| | |
|---|---|
| Temperature of primary dryer discharge gases | 230° F. |
| Temperature of predryer discharge gases | 120° F. |
| Saturation temperature | 170° F. |
| Dry gas flow rate from primary dryer | 73,350 lbs/hr |
| Water vapor flow rate from primary dryer | 23,400 lbs/hr |
| Total gas flow rate from primary dryer | 98,750 lbs/hr |

Therefore, the heat available to the predryer ($Q_{av}$) is $$M_{dg}\left(\Delta_{dg}\Big|^{230}_{120}\right) + M_v\left(\Delta H_v\Big|^{230}_{170}\right) + M_L\left(\Delta H_L\Big|^{170}_{120}\right)$$

where $M_{dg}$ = mass of dry gas $\Delta H_v\Big|^{230}_{170}$ = enthalpy change of dry gas as it goes from 230° F. to 120° F.

$M_v$ = mass of water vapor $\Delta H_v\Big|^{230}_{170}$ = enthalpy change of water vapor as it goes from 230° F. to 170° F. and condenses $M_L$ = mass of condensed water $\Delta H_L\Big|^{170}_{120}$ = enthalpy change of water as it goes from 170° F. to 120° F.

Applying the appropriate values, $Q_{av} = 25.85 \times 10^6$ BTU/hr., which is almost 80% of the total heat expended by the primary dryer.

Total efficiency of the predryer is about 65% of the primary dryer. Thus $$\text{Efficiency rate} = \frac{1800 \text{ BTU/lb H}_2\text{O}}{.65} = 2770 \text{ BTU/lb of water evaporated}$$

Therefore, $\frac{25.85 \times 10^6 \text{ BTU/hr}}{2770 \text{ BTU/lb of water evaporated}} =$ 9332 lbs. of water evaporated per hour in predryer This shows an increase in total evaporation of over 50% compared with use of the primary dryer only, and with no increase in fuel costs. Moreover, the amount of atmospheric pollution is considerably reduced because of the wet scrubbing effect of the predryer.

Having thus described the invention, what is claimed as new and desired to be secured by Letters Patent is:

1. A crop drying system, comprising:
   a primary dryer having a direct heat exchange zone and structure operatively coupled and in communication with said zone including an air inlet, a crop inlet, and outlet-defining means for exhaust air and crop;
   a predryer having an indirect heat exchange zone comprising means defining separate, adjacent, noncommunicating passages therethrough for crop and air respectively, an air inlet and an air outlet respectively operatively coupled and in communication with said air passage, and a crop inlet and outlet respectively operatively coupled and in communication with said crop passage;
   means operatively coupled with said primary dryer air inlet for supplying initially hot, dry air thereto;
   means operatively coupled with said predryer crop inlet for directing initially moist crop thereto;
   crop moving means including conduit means operatively coupling said crop outlet of said predryer and said crop inlet of said primary dryer for passage of predried crop from said predryer to said primary dryer; and
   air moving means including conduit means operatively coupling said air outlet-defining means of said primary dryer and said predryer air inlet, for passage of exhaust air from said primary dryer to said predryer in order to provide a source of heating air to said predryer.

2. The system as set forth in claim 1, said predryer comprising:
   an elongated, tubular shell operatively coupled to said air inlet, said air outlet, said crop inlet and said crop outlet;
   means defining a two-pass air path between and in communication with said air inlet and air outlet for passage of air along the length of said shell in a first axial direction, and thereafter for passage of said air in the opposite axial direction;
   means defining a two-pass crop path between and in communication with said crop inlet and crop outlet, and separate from and adjacent to said air path, for passage of a crop to be dried along the length of said shell in one axial direction, and thereafter for passage of said crop in the other axial direction;
   said crop and air paths being oriented for indirect heat exchange between said air and crop for drying the latter.

3. The system as set forth in claim 2, said air path defining means comprising:
   an elongated, central air-receiving tube;
   structure defining a hollow, elongated annulus disposed about and radially spaced from said tube; and
   walls defining at least one air passageway communicating said tube and said annulus.

4. The system as set forth in claim 3, said crop path defining means comprising:
   structure defining an elongated first crop conduit between said tube and annulus;
   means presenting a second elongated crop conduit between said annulus and shell;
   structure defining a crop passageway between said first and second crop conduits.

5. The system as set forth in claim 2, said first axial direction being opposite in direction relative to said one axial direction.

6. A crop drying method comprising the steps of:
   a. passing a first quantity of predried moisture-containing crop into a primary drying zone;
   b. introducing a quantity of initially hot, relatively dry air into said primary drying zone, and bringing said air and said predried crop into direct intimate contact for effecting a direct heat exchange between said air and said predried crop, thereby transferring at least a portion of said moisture of said predried crop to said air to produce a relatively dry crop and hot, moist air;
   c. exhausting said hot moist air and said dry crop from said primary drying zone;
   d. directing said hot moist air to a predrying zone;
   e. introducing a second quantity of moisture-containing crop into said predrying zone, said second quantity of crop having a higher moisture content than the moisture content of said first quantity of predried crop, separating said second quantity of crop and said hot moist air in said predrying zone by directing the second quantity of crop and said hot moist air along, separate, adjacent, noncommunicating paths, and causing an indirect heat exchange between said hot, moist air and said second quantity of crop within said predrying zone to thereby predry said second quantity of crop;

f. exhausting said hot moist air and said predried crop from said predrying zone;

g. passing said predried crop to said primary drying zone; and h. repeating steps b through g.

7. The method as set forth in claim 6, including the steps of passing said second quantity of crop along said crop directing path in a first direction generally axially and substantially along the length of said predrying zone, and passing said hot, moist air along said air directing path in a second direction generally opposite said first direction and thereafter passing said second quantity of crop along said crop directing path in said second direction, and passing said hot moist air along said air directing path in said first direction.

* * * * *